UNITED STATES PATENT OFFICE 2,120,728

WATER-INSOLUBLE AZO DYESTUFFS

Gérald Bonhôte, Basel, Switzerland, assignor to The firm of Society of Chemical Industry in Basle, Basel, Switzerland No Drawing. Application October 10, 1936, Serial No. 105,150. In Switzerland October 23, 1935

5 Claims. (Cl. 260—95)

The present invention relates to new water-insoluble azo-dyestuffs.

It has been found that by combining the diazo-compound of the aryl esters of the 2-amino-benzoic acid with various coupling components, particularly with arylides of 2,3-hydroxynaphthoic acids, new dyestuffs are obtained which may be characterized by excellent properties of fastness. If sulfonated coupling components have been used there are obtained wool or cotton dyestuffs according to the selection of these components. If unsulfonated coupling components have been used there are obtained lacquer or pigment dyestuffs which, when produced on suitable substrata, dye the same very valuable tints. Among these insoluble dyestuffs those are particularly valuable which are produced with aid of such arylides of 2,3-hydroxynaphthoic acids which are obtainable themselves by condensation of 2,3-hydroxynaphthoic acid with aromatic amines of the benzene and naphthalene series. They correspond to the general formula

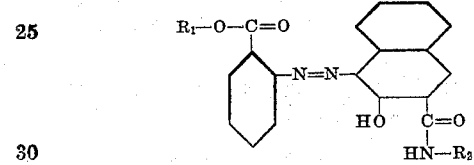

in which $R_1$ stands for an aryl nucleus of the benzene series and $R_2$ stands for an aryl nucleus of the group consisting of aryl nuclei of the benzene and naphthalene series. Among those dyestuffs those are particularly valuable which derive from such arylides of 2,3-hydroxynaphthoic acid which are produced themselves with aid of aromatic amines of the benzene series, particularly if the aromatic amine, such as ortho-anisidine or ortho-phenetidine contains an alkoxy group in ortho-position to the $NH_2$-group, and in which as diazotizing component the para-chlorophenol ester of the ortho-aminobenzoic acid is used. These particularly valuable dyestuffs correspond therefore to the general formula

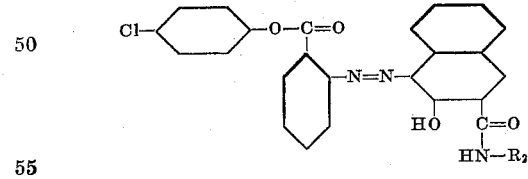

in which $R_2$ stands for an aryl nucleus of the benzene series which is substituted in ortho-position to the NH-group by an alkoxy group selected itself from the group consisting of $OCH_3$ and $OC_2H_5$.

The following examples illustrate the invention:—

Example 1

24.8 parts by weight of para-chlorophenyl ester of 2-aminobenzoic acid are diazotized as usual and the diazo-compound is introduced into a solution of 26.3 parts of 2,3-hydroxynaphthoic acid ortho-anisidide, 40 parts of caustic soda solution of 30 per cent. strength, 15 parts of sodium carbonate and 1000 parts of water. The dyestuff thus formed is immediately precipitated. The orange precipitate is filtered and dried. The new dyestuff corresponds to the formula

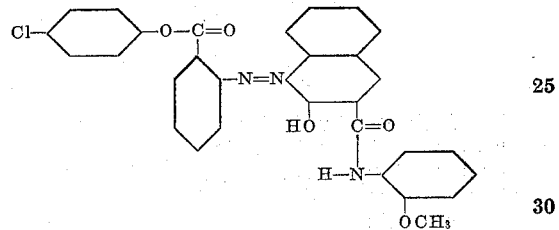

Similar dyestuffs are obtained when replacing the para-chlorophenyl ester of 2-aminobenzoic acid by the phenyl ester, the various cresyl esters, the ortho-chlorophenylester, and the like, of the 1,2-aminobenzoic acid.

Example 2

Cotton yarn is impregnated with a solution of 7 grams of 2,3-hydroxynaphthoic acid-2'-methoxy anilide, 12 cc. of caustic soda solution of 34° Bé., 10 cc. of Turkey red oil and 7 cc. of formaldehyde solution of 40 per cent. strength, per litre; it is then wrung out and developed in the presence of aluminium sulfate in a diazo-solution buffered with sodium acetate and corresponding with 2 grams of the para-chlorophenyl ester of 2-aminobenzoic acid, per litre. There is produced a pure orange tint of excellent properties of fastness. With the 5-chloro-2-anisidide of the 2,3-hydroxynaphthoic acid there are obtained somewhat more reddish dyeings having similar fastness properties. These two dyestuffs correspond to the formulas:

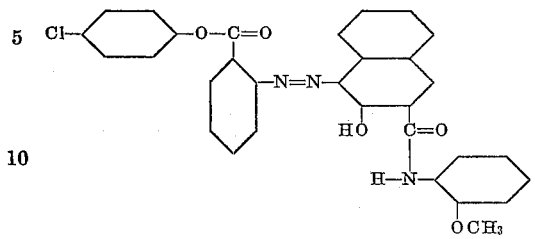

Further orange tints are obtained with other arylides of 2,3-hydroxynaphthoic acid, for example with the para- and meta-toluidides, the 4-chloro-2-toluidide, the 5-chloro-2-anisidide, the 5-chloro-2-toluidide and the ortho- and meta-chloranilide.

Scarlet red tints are obtained with the para-chloranilide, the α- and β-naphthylamide, the para-anisidide, the para-phenetidide; and red-brown tints with the 2-methyl-4-methoxyanilide and the 2,4-dimethoxy-5-chloranilide of 2,3-hydroxynaphthoic acid.

Similar dyestuffs are further obtained when coupling on the fiber the arylides of 2,3-hydroxynaphthoic acid mentioned in these examples with other diazotized aryl esters of 1,2-aminobenzoic acid, such as for example the phenyl ester, the cresyl esters, the ortho-chlorophenylester, and the like.

Similar tints are produced in printing or on the piece.

What I claim is:—

1. The azo-dyestuffs obtained from diazotized aryl esters of orthoaminobenzoic acid and corresponding to the general formula

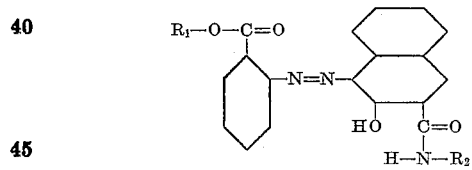

in which R₁ stands for an aryl nucleus of the benzene series and R₂ stands for such an aryl nucleus of the benzene series which is substituted in ortho-position to the NH-group by an alkoxy group selected itself from the group consisting of OCH₃ and OC₂H₅, which products are orange to red powders insoluble in water and which, when produced on the vegetable fiber, dye the same fast orange to red tints.

2. The azo-dyestuffs obtained from diazotized aryl esters of ortho-aminobenzoic acid and corresponding to the general formula

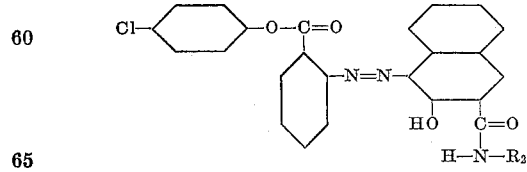

in which R₂ stands for an aryl nucleus of the benzene series which is substituted in ortho-position to the NH-group by an alkoxy group selected itself from the group consisting of OCH₃ and OC₂H₅, which products are orange powders insoluble in water and which, when produced on the vegetable fiber, dye the same fast orange tints.

3. The azo-dyestuffs obtained from diazotized aryl esters of ortho-aminobenzoic acid and corresponding to the general formula

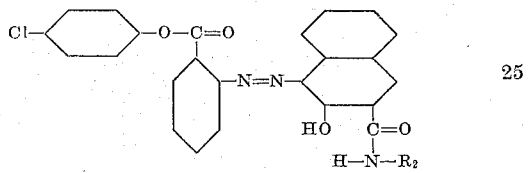

in which R₂ stands for an aryl nucleus of the benzene series which is substituted in ortho-position to the NH-group by an OCH₃-group, which products are orange powders insoluble in water and which, when produced on the vegetable fiber, dye the same fast orange tints.

4. The azo-dyestuff of the formula

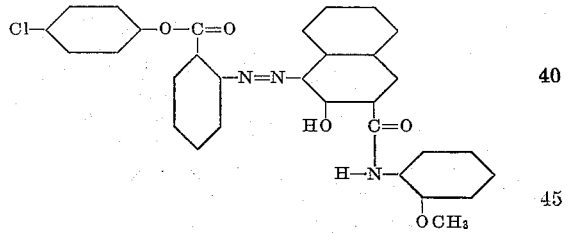

which product is an orange powder which, when produced on cotton dyes the same fast orange tints.

5. The azo-dyestuff of the formula

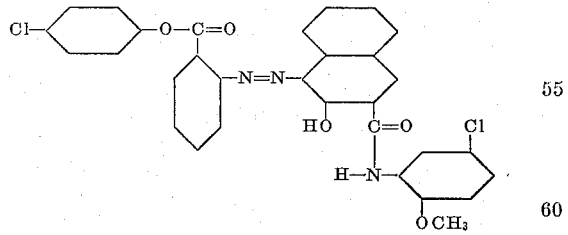

which product is an orange powder which, when produced on cotton dyes the same fast orange tints.

GÉRALD BONHÔTE.